United States Patent
Jabri et al.

(10) Patent No.: US 7,133,521 B2
(45) Date of Patent: Nov. 7, 2006

(54) METHOD AND APPARATUS FOR DTMF DETECTION AND VOICE MIXING IN THE CELP PARAMETER DOMAIN

(75) Inventors: Marwan Anwar Jabri, Broadway (AU); Jianwei Wang, Killarney Heights (AU); Sameh Georgy, Riverwood (AU); Michael Ibrahim, Ryde (AU)

(73) Assignee: Dilithium Networks Pty Ltd., Broadway (AU)

( * ) Notice: Subject to any disclaimer, the term of this patent is extended or adjusted under 35 U.S.C. 154(b) by 0 days.

(21) Appl. No.: 10/693,253

(22) Filed: Oct. 23, 2003

(65) Prior Publication Data
US 2004/0174984 A1 Sep. 9, 2004

Related U.S. Application Data

(60) Provisional application No. 60/421,342, filed on Oct. 25, 2002, provisional application No. 60/421,271, filed on Oct. 25, 2002.

(51) Int. Cl.
*H04M 1/50* (2006.01)
(52) U.S. Cl. .................. 379/386; 379/204.01
(58) Field of Classification Search ............. 704/201, 704/219–221, 500, 503; 379/386, 202.01–206.01; 381/119; 370/267
See application file for complete search history.

(56) References Cited

U.S. PATENT DOCUMENTS 5,150,410 A * 9/1992 Bertrand ............... 379/202.01

6,873,701 B1 * 3/2005 Tian et al. .................. 379/386
2004/0158647 A1 8/2004 Omura

FOREIGN PATENT DOCUMENTS

CA 2202025 A1 10/1998

\* cited by examiner

*Primary Examiner*—Daniel Swerdlow
(74) *Attorney, Agent, or Firm*—Townsend and Townsend and Crew LLP

(57) ABSTRACT

A method and apparatus for DTMF detection and voice mixing in the code-excited linear prediction (CELP) parameter space, without fully decoding and reconstructing the speech signal. The apparatus includes a Dual Tone Multiplexed Frequency (DTMF) signal detection module and a multi-input mixing module. The DTMF signal detection module detects DTMF signals by computing characteristic features from the input CELP parameters and comparing them with known features of DTMF signals. The multi-input mixing module mixes multiple sets of input CELP parameters, that represent multiple voice signals, into a single set of CELP parameters. The mixing computation is performed by analyzing each set of input CELP parameters, determining the order of importance of the input sets, selecting a strategy for mixing the CELP parameters, and outputting the mixed CELP parameters. The method includes inputting one or more sets of CELP parameters and external commands, detecting DTMF tones, mixing multiple sets of CELP parameters and outputting the DTMF signal, if detected, and the mixed CELP parameters.

24 Claims, 17 Drawing Sheets

METHOD AND APPARATUS FOR DTMF DETECTION AND VOICE MIXING IN THE CELP PARAMETER DOMAIN

CROSS-REFERENCES TO RELATED APPLICATIONS

This patent application claims priority to U.S. Provisional Patent Application Ser. No. 60/421,342 titled "Method for In-Band DTMF Detection & Generation In Voice Transcoder," filed Oct. 25, 2002 and U.S. Provisional Patent Application Serial No. 60/421,271 titled "Method for Multiple Input Source Voice Transcoding," filed Oct. 25, 2002, which are both incorporated by reference for all purposes.

BACKGROUND OF INVENTION

The present invention relates generally to processing telecommunication signals. More particularly, the invention provides a method and apparatus for performing DTMF (i.e., Dual-Tone Multi-Frequency) detection and voice mixing in the CELP (i.e., Code Excited Linear Prediction) domain. Specifically, it relates to a method and apparatus for detecting the presence of DTMF tones in a compressed signal from the CELP parameters, and also for mixing multiple input compressed voice signals, represented by multiple sets of CELP parameters, into a single set of CELP parameters. Merely by way of example, the invention has been applied to voice transcoding, but it would be recognized that the invention may has a much broader range of applicability.

Telecommunications techniques have developed over the years. Recently, there have been a variety of digital voice coders developed to meet certain bandwidth demands of different packet-networks and mobile communication systems. Digital voice coders provide compression of a digitized voice signal as well as reverse transformation functions. Rapid growth in diversity of networks and wireless communication systems generally requires that speech signals be converted between different compression formats. A conventional method for such conversion is to place two voice coders in tandem to serve a single connection. In such a case, the first compressed speech signal is decoded to a digitized signal through the first voice decoder, and the resulting digitized signal is re-encoded to a second compressed speech signal through the second voice encoder. Two voice coders in tandem are commonly referred to as a "tandem coding" approach. The tandem coding approach is to fully decode the compressed signal back to a digitized signal, such as Pulse Code Modulation (PCM) representation, and then re-encode the signal. This often requires a large amount of processing and incurs increased delays. More efficient approaches include technologies called smart transcoding, among others.

In addition to the requirements of voice transcoding among current diverse networks and wireless communication systems, it is also required to provide functionality for advanced feature processing. A specific example of can advanced feature is Dual Tone Multiplexed Frequency (DTMF) signal detection. DTMF signaling is widely used in telephone dialing, voice mail, electronic banking systems, even with Internet Protocol (IP) phones to key in an IP address. In telecommunications speech codecs, the in-band DTMF signals are encoded to a compressed bitstream. Conventional DTMF signal detection is performed in the speech signal space. As merely an example, the Goertzel algorithm with a two-pole Infinite Impulse Response (IIR) type filter is widely used to extract the necessary spectral information from an input digitized signal and to form the basis of DTMF detection.

When DTMF signal detection is required in voice transcoding, a tandem approach is commonly used. In this case, the input compressed speech signal has to be decoded back to the speech domain for DTMF signal detection, and then re-encoded to a compressed format. Since the processing in smart voice transcoding is performed in the CELP parameter space, known DTMF detection methods are often not suitable. Furthermore, known smart voice transcoding methods do not include DTMF signal detection functionality and are therefore limited.

Another specific example of an advanced feature for voice transcoding is the ability to handle multiple input signals. If the input signals are multiple speech signals; the voice mixer simply mixes the speech signals and outputs the mixed speech signal. However, in a packet network or a wireless communication system, the input signals are multiple compressed signals. Furthermore, with the current diversity of packet networks and wireless communication systems, the input signals may be in various compression formats. The conventional voice mixing solution performs mixing of the input packets by decoding the input packets into speech signals, mixing the speech signals, and re-encoding the mixed speech signals into output packets. This requires significant computational complexity to decode and re-encode each input compressed signal.

In an attempt to improve the voice quality produced by voice mixing for packet networks, certain "smart" conference bridging methods have been proposed. Although such method can provide side information and can improve the quality of mixed voice signals, it still uses a tandem approach that involves decoding, mixing in the speech space and re-encoding. This approach is often not suitable for a voice transcoder that operates in the CELP parameter space without going to the speech space.

From the above, it is seen that techniques for improved processing of telecommunication signals are highly desired.

BRIEF SUMMARY OF THE INVENTION

According to the present invention, techniques for processing telecommunication signals are provided. More particularly, the invention provides a method and apparatus for performing DTMF detection and voice mixing in the CELP domain. More specifically, it relates to a method and apparatus for detecting the presence of DTMF tones in a compressed signal from the CELP parameters, and also for mixing multiple input compressed voice signals, represented by multiple sets of CELP parameters, into a single set of CELP parameters. Merely by way of example, the invention has been applied to voice transcoding, but it would be recognized that the invention has a much broader range of applicability.

In a specific embodiment, the present invention provides a method and apparatus for advanced feature processing in voice transcoders using CELP parameters. The apparatus receives as input one or more sets of CELP parameters, that may have been interpolated, if required, to match the frame size, subframe size or other characteristic, and external commands. The apparatus comprises a DTMF signal detection module that detects DTMF signals from input CELP parameters, and a multi-input mixing module that mixes CELP parameters from multiple CELP codecs into a single set of CELP parameters. In a specific embodiment, the multi-input mixing module has a dynamic topology and is capable of configuring different topologies according to the number of input compressed signals. The apparatus outputs the DTMF signal, if detected, and the mixed CELP parameters.

The DTMF signal detection module includes a DTMF feature computation unit to compute the DTMF features, DTMF feature pattern tables with stored feature data corresponding to DTMF signals, a DTMF feature comparison unit to compare the computed features with the stored pattern tables, a DTMF feature buffer to store past feature data, and a DTMF decision unit to determine the DTMF signals.

The multi-input mixing module includes a feature detection unit to detect a plurality of speech features from each set of CELP parameters, a sorting unit to rank the importance of each set of CELP parameters, a mixing decision unit to determine the mixing strategy, and a mixing computation unit to perform the mixing of multiple sets of CELP parameters.

The invention provides a method for advanced feature processing in the CELP parameter space. The method includes receiving one or more sets of CELP parameters that may have been interpolated to match the frame size, subframe size or other characteristic and external commands; detecting DTMF tones, mixing multiple sets of CELP parameters, and outputting the detected DTMF signal and mixed CELP parameters.

According to an alternative specific embodiment, the present invention provides a method for detecting DTMF signals in the CELP parameter space The method includes computing features for DTMF detection from CELP parameters; comparing features with pre-computed DTMF feature data; checking the states of DTMF detection and features in previous subframes; determining the DTMF signals according to the DTMF signal specifications; updating the states and feature parameters of previous subframes; and outputting the detected DTMF digit.

In yet an alternative specific embodiment, the invention provides a method for mixing multiple sets of input CELP parameters. The method includes receiving multiple sets of CELP parameters; mixing sets of CELP parameters according to a chosen mixing strategy; and outputting the mixed CELP parameters. The method of mixing multiple sets of input CELP parameters into a single set of mixed CELP parameters further comprises computing signal feature parameters required for determining importance of each input; arranging the order of importance of the multiple sets of input CELP parameters according to the feature parameter computation results; considering priorities from external control commands; selecting the inputs that are mixed; and computing the mixed CELP parameters from selected inputs.

In an alternative specific embodiment, the invention provides an apparatus for feature processing of telecommunications signals. The apparatus is adapted to operate in a CELP domain without decoding to a speech signal domain. The apparatus has a dual-tone modulation frequency (DTMF) signal detection module. The dual-tone modulation frequency (DTMF) signal detection module is adapted to determine one or more DTMF tones based upon at least one or more input CELP parameters, and the DTMF signal detection module is also adapted to output the one or more DTMF signals if determined.

In yet an alternative embodiment, the invention provides an apparatus for feature processing of telecommunications signals. The apparatus is adapted to operate in a CELP domain without decoding to a speech signal domain. The apparatus has a multi-input mixing module coupled to the DTMF signal detection module. The multi-input mixing module is adapted to process CELP parameters from more than one CELP-based codecs, representing respective more than one voice signals, into a single set of CELP parameters.

Numerous benefits exist with the present invention over conventional techniques. In a specific embodiment, the invention provides an easy way of detecting DTMF signals without converting CELP information back into the speech domain. Additionally, the invention can be provided using conventional hardware and software. In certain embodiments, the invention also provides for additional advanced modules that can be coupled to a transcoding technology. Depending upon the embodiment, one or more of these benefits or features can be achieved. These and other benefits are described throughout the present specification and more particularly below.

The accompanying drawings, which are incorporated in and form part of the specification, illustrate embodiments of the invention and, together with the description, serves to explain the principles of the invention.

BRIEF DESCRIPTION OF THE DRAWINGS

The objects, features, and advantages of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

According to the present invention, techniques for processing telecommunication signals are provided. More particularly, the invention provides a method and apparatus for performing DTMF detection and voice mixing in the CELP domain. More specifically, it relates to a method and apparatus for detecting the presence of DTMF tones in a compressed signal from the CELP parameters, and also for mixing multiple input compressed voice signals, represented by multiple sets of CELP parameters, into a single set of CELP parameters. Merely by way of example, the invention has been applied to voice transcoding, but it would be recognized that the invention has a much broader range of applicability.

Figure 1:
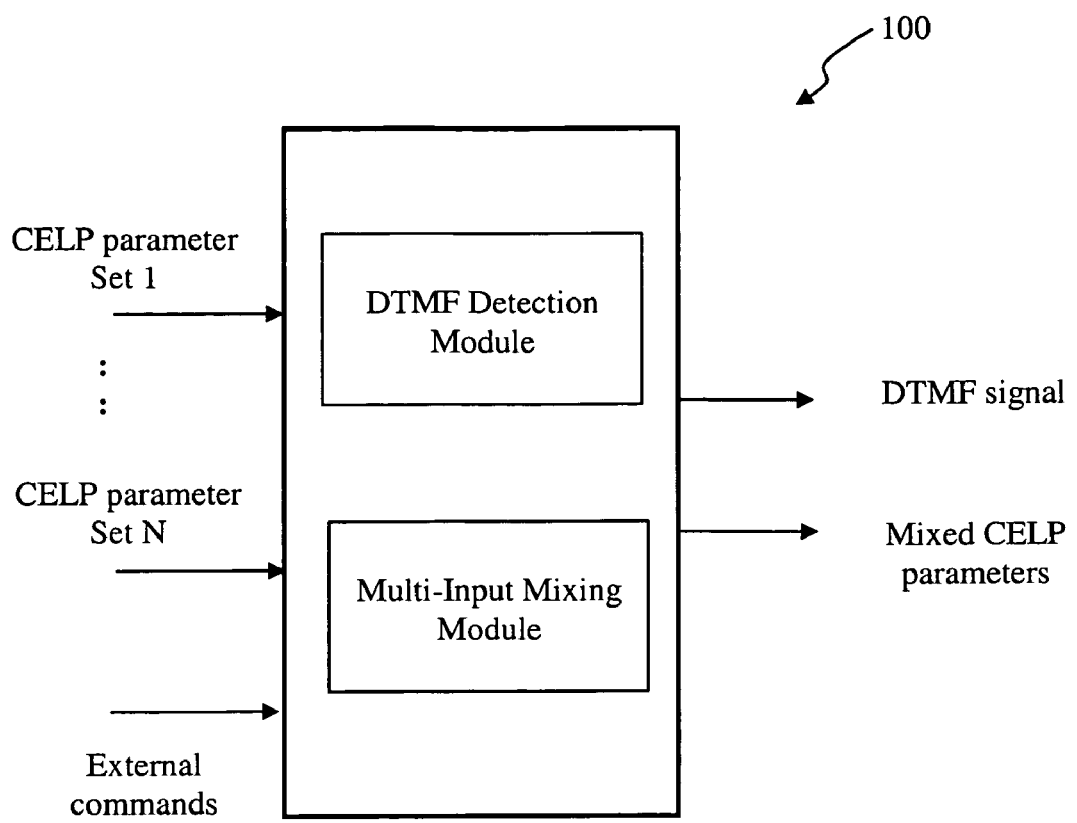
FIG. 1 is a simplified block diagram representation of an apparatus for DTMF detection and multi-input mixing in the CELP parameter domain according to an embodiment of the present invention.

FIG. 1 is a block diagram illustrating an advanced feature processing module 100. Preferably, the module has a DTMF detection module and multi-input mixing module according to an embodiment of the present invention. One or more sets of CELP parameters that were derived by unpacking the bitstreams transmitted by one or more CELP-based codecs, as well as external commands, are received as input. The outputs are the DTMF signal, if detected, and the mixed CELP parameters. Advanced feature processing is capable of different configurations or topologies in different applications. Additional processing modules may be included in the advanced feature processing module, the DTMF detection module may be omitted, or the multi-input mixing module may be omitted.

Preferably, the dual-tone modulation frequency (DTMF) signal detection module is adapted to determine one or more DTMF tones based upon at least one or more input CELP parameters (e.g., silence descriptor frames), and the DTMF signal detection module is also adapted to output the one or more DTMF signals if determined. Preferably, the multi-input mixing module is adapted to process CELP parameters from more than one CELP-based codecs, representing respective more than one voice signals, into a single set of CELP parameters.

DTMF signaling is widely used in telephone dialing, voice mail, electronic banking systems, even with IP phones to key in an IP address. In many standardized telecommunication speech codecs, the in-band DTMF signals are encoded to a CELP-based bitstream during voice compression. Further details are described throughout the present specification and more particularly below.

Figure 2:
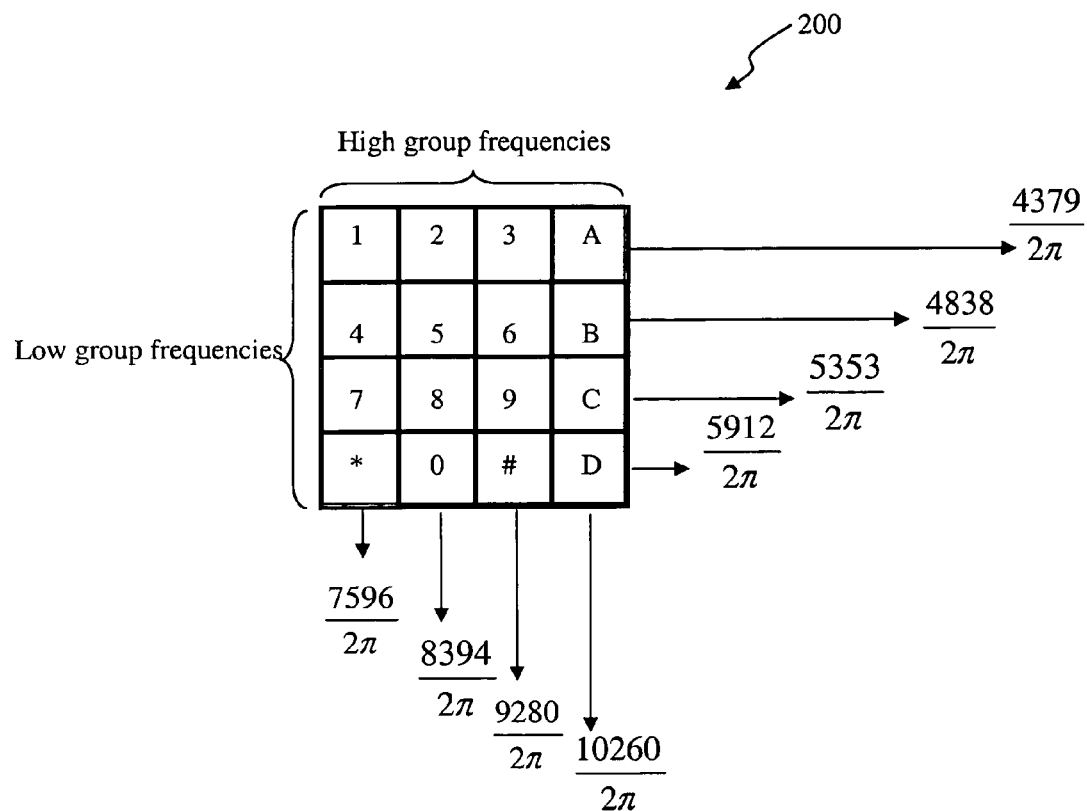
FIG. 2 illustrates DTMF signal frequency categorization according to an embodiment of the present invention.

A DTMF signal 200 corresponds to one of sixteen touch-tone digits (0–9, A–D, # and *) shown in FIG. 2. The DTMF signal has a low-frequency tone and a high frequency tone. There are four low frequencies and four high frequencies that are possible. The horizontal rows represent the low frequencies and the vertical columns represent the high frequencies. The low frequencies are: 697, 770, 852 and 941 Hz. The high frequencies are: 1209, 1336, 1477 and 1633 Hz. Thus, each of the sixteen DTMF signals is uniquely identified according to certain embodiments.

In general, the DTMF algorithm should respond to signals whose frequencies are within certain tolerances. Somewhat wider tolerances may also be acceptable, however wider limits may increase susceptibility to noise and may result in applying digit simulation to speech. Also, the DTMF algorithm should provide proper reception of signals whose power levels are within the acceptable range. Note that the sending amplitude and transmission attenuation may be different for different frequencies.

Furthermore, the DTMF algorithm should recognize signals whose duration exceeds the minimum expected value from subscribers. To guard against false signal indications, the DTMF algorithm should not respond to signals whose duration is less than the specified maximum value. Similarly, pause intervals greater than a specified minimum value should be recognized by the DTMF algorithm. To minimize spurious glitches or errors, for instance, double-registration of a signal if reception is interrupted by a short break in transmission or by a noise pulse, and also interruptions shorter than a specified maximum value, must not be recognized.

Figure 3:
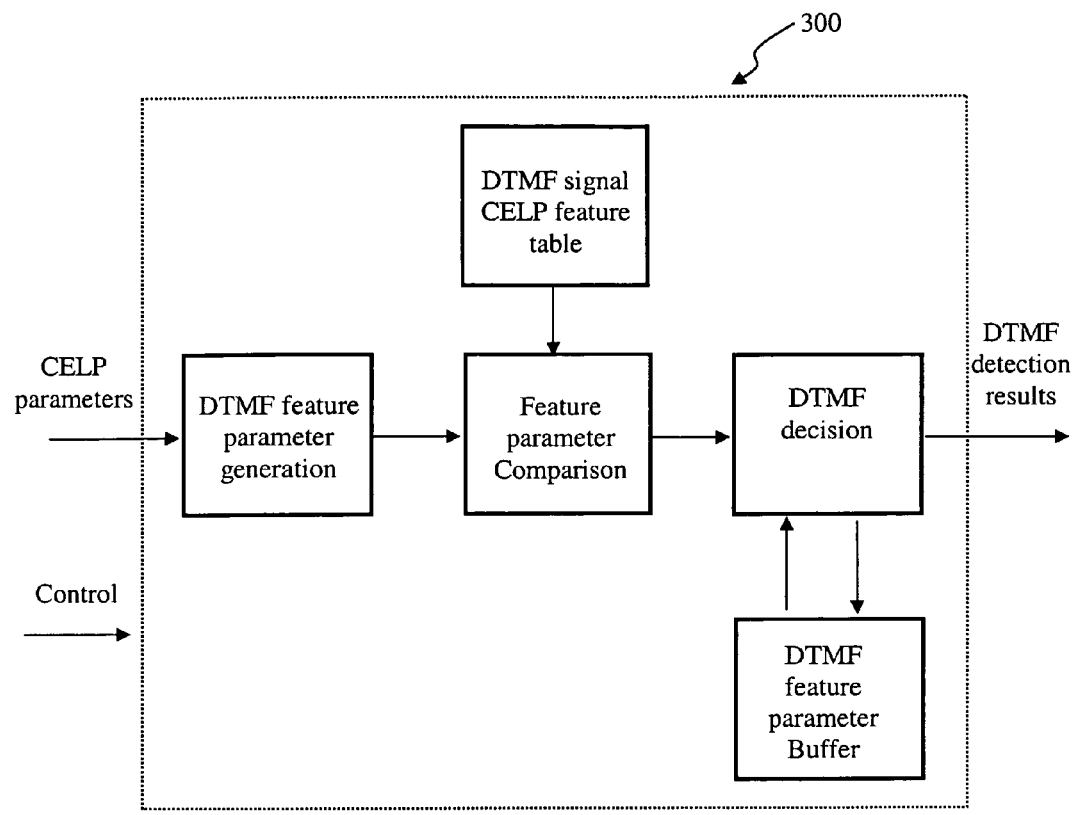
FIG. 3 is a simplified block diagram representation of an apparatus for DTMF signal detection according to an embodiment of the present invention.

FIG. 3 illustrates the DTMF detection module 300 in detail. This diagram is merely an example, which should not unduly limit the scope of the claims herein. One of ordinary skill in the art would recognize many variations, alternatives, and modifications. The DTMF detection module takes the CELP parameters and external control commands as input. The DTMF detection module comprises a DTMF feature parameter generation sub-module that computes the DTMF signal characteristic features from CELP parameters, a pre-defined look-up table that stores feature data corresponding to each DTMF signal, a comparison sub-module that computes the similarities between input feature parameters and look-up tables, a DTMF decision sub-module that determines DTMF signals through a finite-state machine, and a buffer that stores the data of previous subframes. As an example, DTMF signal characteristic feature parameters can be signal energy information, pitch information and spectrum information. Such information can be obtained from input CELP parameters. The comparison sub-module checks the input signals by matching input feature parameters with look-up tables. If the matching results are above a certain threshold, the potential DTMF digits will be output to the DTMF decision sub-module. The DTMF decision sub-module checks previous states against the DTMF signal requirement specifications to determine whether a DTMF tone is present.

Preferably, the dual-tone modulation frequency (DTMF) signal detection module has a DTMF feature computation unit capable of receiving the one or more CELP parameters and external commands and computing one or more DTMF features. The module also has one or more DTMF feature pattern tables having one or more specific feature data corresponding to the one or more DTMF signals. A DTMF feature comparison unit is also included. The DTMF feature comparison unit is adapted to process the one or more DTMF features derived from the DTMF feature computation unit with the one or more specific feature data in DTMF feature pattern tables to identify one or more DTMF specific signals and to classify the one or more DTMF specific signals. A DTMF feature buffer is included. The feature buffer is capable of storing the one or more DTMF feature parameters and the one or more DTMF classification data of one or more previous sub-frames or frames. Additionally, the module includes a DTMF decision unit capable of determining the one or more DTMF signals from DTMF classification data of a current and one or more previous sub-frames or frames according to one or more DTMF specifications and sending out the DTMF determined signals. Preferably, the DTMF feature computation unit processes the one or more DTMF features using at least one or more of linear prediction parameters information, pitch information, and energy information. The DTMF feature pattern tables have specific pre-computed feature data associated from CELP parameters corresponding to the one or more DTMF signals. In certain embodiments, the DTMF feature comparison unit classifies DTMF specific signals corresponding to 16 digits of "1", "2", "3", "4", "5", "6", "7", "8", "9", "0", "A", "B", "C", "D", "#", and "*" according to the internal telecommunication unit (ITU) specification. Depending upon the embodiment, the DTMF decision unit further comprises of a logical state machine and DTMF signal criteria to determine the one or more DTMF signals and one or more specific digits. These and other features are described throughout the present specification and more particularly below.

Figure 4:
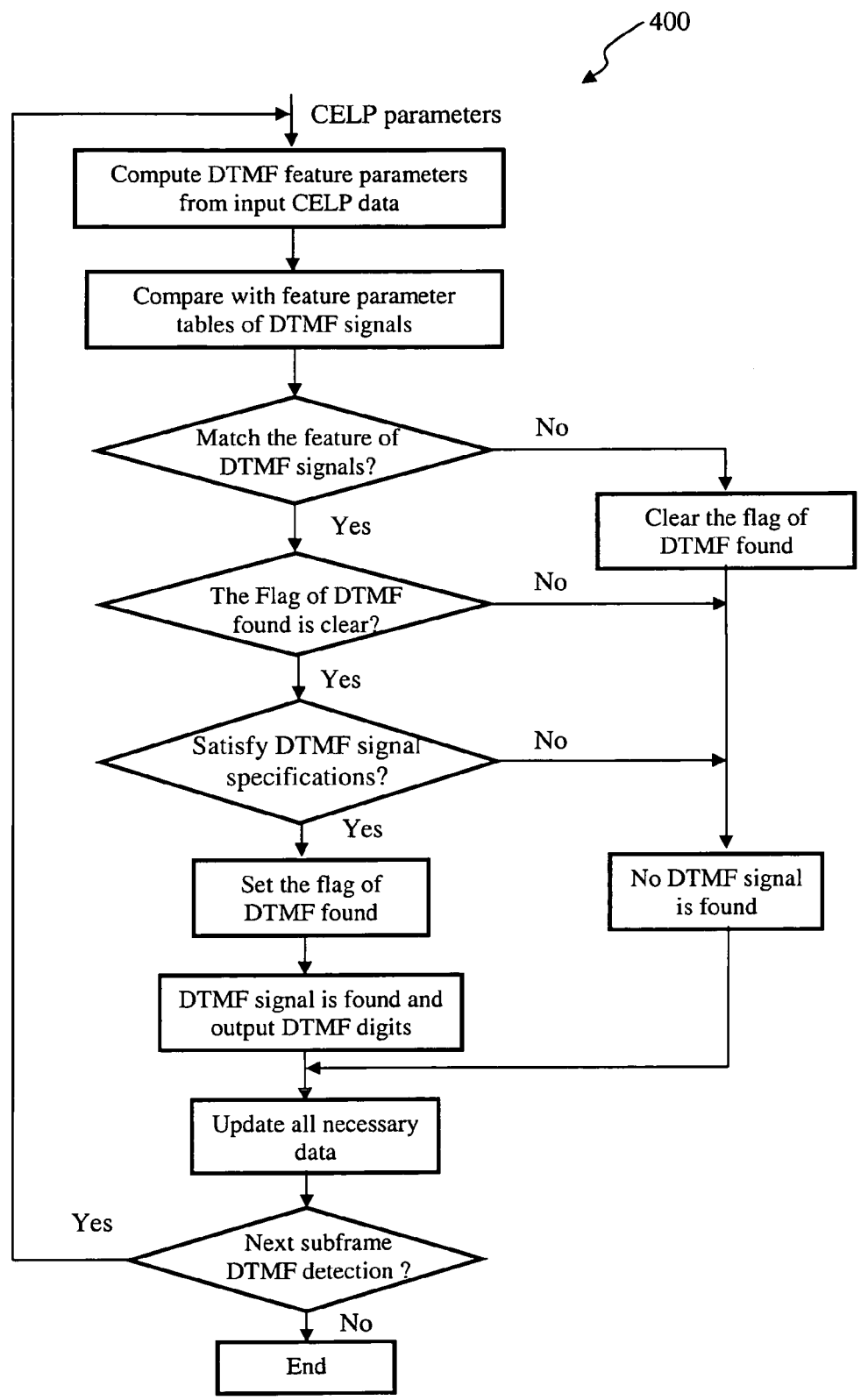
FIG. 4 is a simplified flowchart of a method for DTMF signal detection using CELP parameters according to an embodiment of the present invention.

FIG. 4 illustrates a flowchart diagram of the DTMF detection algorithm 400. Firstly, from the CELP parameters, such as Line Spectral Pairs (LSP), pitch lag, and gains of the input codec, the DTMF features are computed. Secondly, the computed features are compared with features in predefined tables for the sixteen possible DTMF signals. If there is no match, the DTMF detect flag is reset and no DTMF signal state is reached. An update of all necessary data takes place. If there is another input subframe, the detection algorithm continues, otherwise the detection algorithm ends. If there is a DTMF match, the DTMF signal requirement specification is checked against the potential detection results. If it complies, the DTMF flag is set, and the DTMF digit is signaled to the output. Again an update of all necessary data takes place and if there is another subframe, the detection algorithm continues, otherwise the detection algorithm ends. The detection algorithm completely operates in the CELP coding parameter space and is performed for every input subframe.

Figure 5:
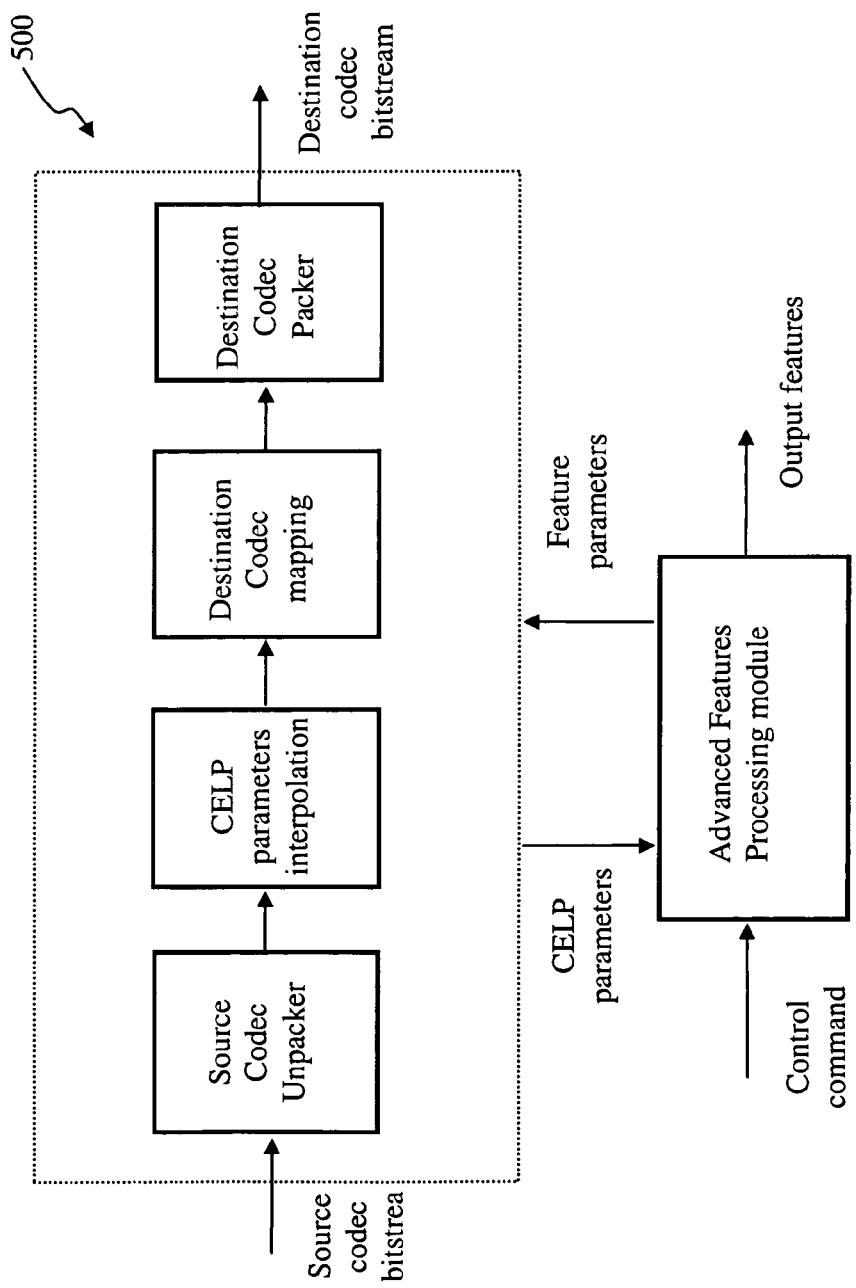
FIG. 5 is a simplified block diagram representation of DTMF detection and Multi-input mixing within a smart voice transcoder according to an embodiment of the present invention.

An application of advanced feature processing is in voice transcoding between two Code Excited Linear Prediction (CELP) based voice codecs as shown in the block diagram 500 of FIG. 5. The source codec unpacker module unpacks the source codec bitstream to produce the CELP parameters. The CELP parameter interpolation module interpolates the CELP parameters to match the frame length and subframe length of the destination codec if required. The interpolated CELP parameters are mapped to encoded destination codec parameters. The destination codec packer packs the encoded parameters to the bitstream in the required format. In addition to this typical voice transcoding approach, an advanced feature processing module 501 is added to the voice transcoder. The advanced feature processing module takes the interpolated CELP parameters as its input, and computes desired features. The resulting features are either output in parallel to the bitstream of destination codec (transmitted out-of-band), or passed to the voice transcoder for enhanced processing (transmitted in-band), or transmitted both in-band and out-of-band. The DTMF detection algorithm works in parallel with voice transcoding i.e. it does not interrupt the main stream voice transcoding.

As an example, the DTMF signal detection is applied to the voice transcoder between the GSM-AMR voice codec and the G.723.1 voice codec. Examples of transcoding methods and systems can be found at Method & Apparatus for Transcoding Video & Speech Signals, in the name of Jabri, Marwan, Anwar, PCT/US02/08218 filed Mar.13, 2002 and A Transcoding Method And System Between CELP-Based Speech Codes in the names of Jabri, Marwan Anwar, Wang, Jianwei, Gould, Stephen PCT/US03/00649 filed Jan. 08, 2003, commonly owned and hereby incorporated by reference for all purposes. In a specific embodiment, the DTMF signal detection module and the multi-input module are incorporated within a CELP-based voice transcoder.

Figure 6:
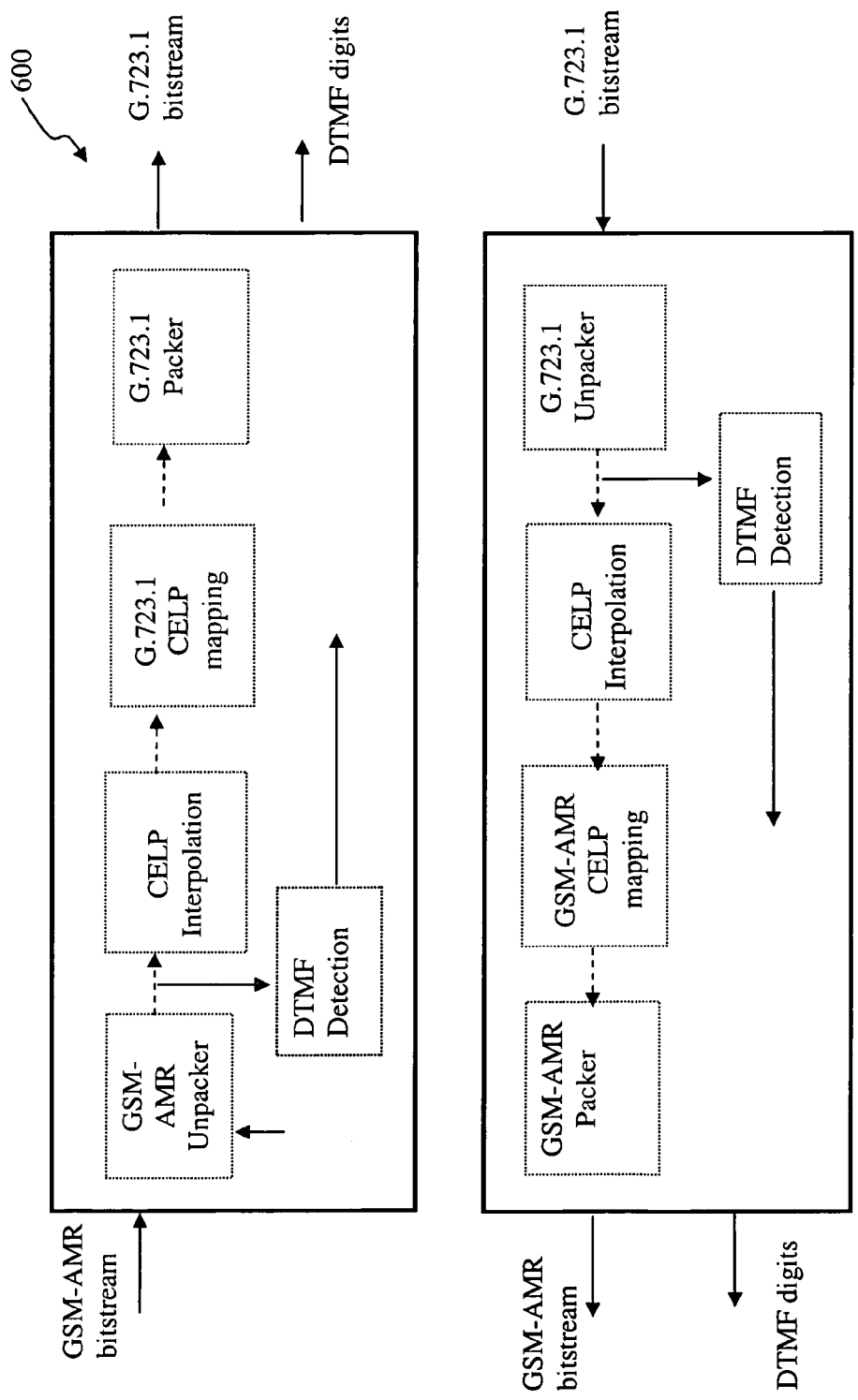
FIG. 6 is a simplified block diagram representation of DTMF detection module in voice transcoding between voice codec GSM-AMR and G.723.1 according to an embodiment of the present invention.

FIG. 6 shows a simplified block diagram of a full-duplex GSM-AMR⇔G.723.1 voice transcoder 600 enabled with the advanced feature of DTMF detection. Using the DTMF signal detection procedure of the present invention, DTMF detection can be performed on GSM-AMR input CELP parameters in parallel to the voice transcoding process to a G.723.1 codec bitstream. First, a 20 ms frame input GSM-AMR bitstream is unpacked to CELP parameters for four 5 ms subframes. These four GSM-AMR subframes with another two GSM-AMR subframes from the CELP parameters of the next 20 ms frame are interpolated into one G.723.1 frame of CELP parameters. The resulting interpolated CELP parameters are mapped and packed to the bitstream for one G.723.1 frame. In parallel to this procedure, the CELP parameters of the four GSM-AMR subframes are fed to a DTMF detection module inside the voice transcoder. The DTMF detection module computes the DTMF features from each subframe of CELP parameters, compares them with pre-defined DTMF feature data, and determines whether the input compressed speech signal contains a DTMF signal according to the minimum requirements of the DTMF specification. If the input feature parameters match the pre-defined DTMF data in the look-up tables, and satisfy the requirements of DTMF signals through the described finite-state machine, the detected DTMF digit is signaled to the output. If the DTMF detection module is enabled in the voice transcoder from GSM-AMR to G.723.1, the DTMF detection algorithm executes on every incoming GSM-AMR frame. Thus, it is able to detect DTMF signals from the input CELP parameters at all times during voice transcoding.

Similarly, in transcoding from G.723.1 to GSM-AMR, the DTMF detection computation can be applied on the incoming G.723.1 frames. Slight variations will exist due to the different subframe size and frame size of the GSM-AMR and G.723.1 codecs.

Figure 7:
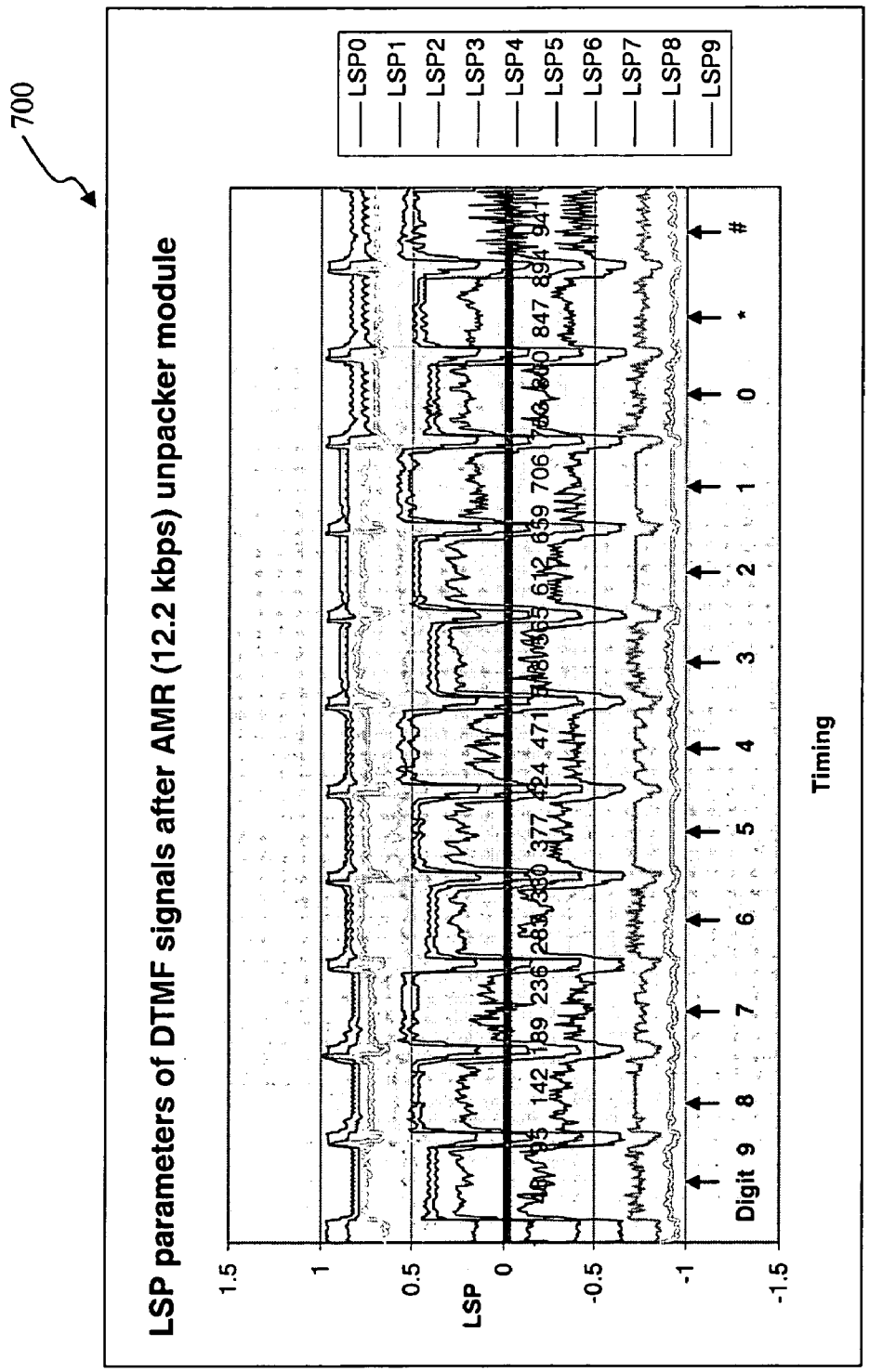
FIG. 7 illustrates a LSP representation of DTMF signals from an input GSM-AMR codec bitstream according to an embodiment of the present invention.
Figure 8:
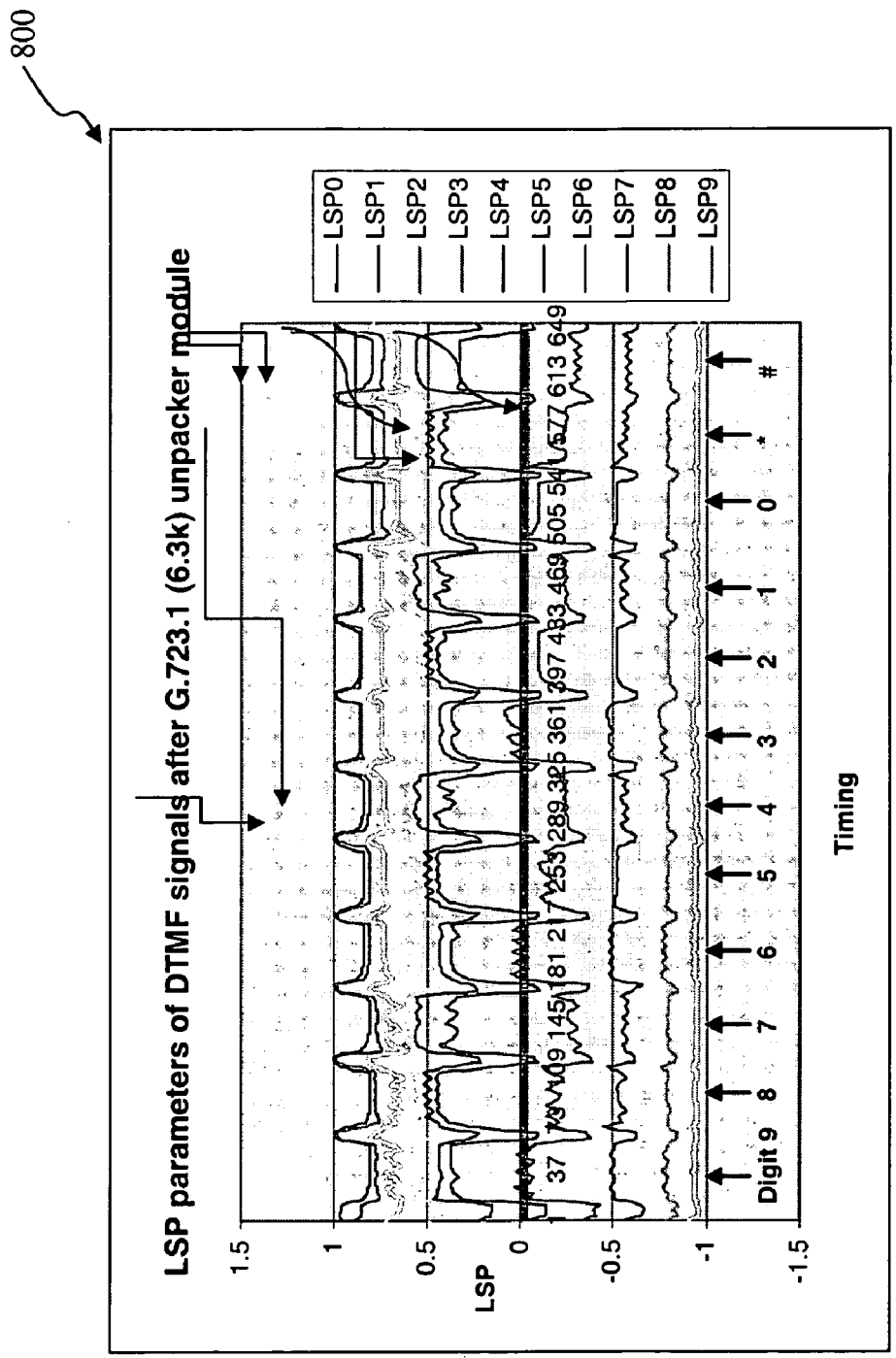
FIG. 8 illustrates a LSP representation of DTMF signals from an input G.723.1 codec bitstream according to an embodiment of the present invention.

In order to show that the unique specific features of DTMF signals can be computed from CELP parameters, FIG. 7 illustrates the Line Spectral Pairs (LSP) parameters 700 of incoming GSM-AMR frames at the rate of 12.2 kbps for the possible DTMF digits. FIG. 8 illustrates the Line Spectral Pairs parameters 800 of incoming G.723.1 frames at the rate of 6.3 kbps for the possible DTMF digits. Similarly, the unpacked CELP pitch lag and gain information are used to detect and classify the DTMF digits.

Note, that the GSM-AMR codec can operate in eight different modes of speech compression and the G.723.1 codec can operate in two different modes of speech compression. The DTMF detection algorithm illustrated in FIG.

5 applies to any rate of the GSM-AMR and G.723. 1 codecs. The algorithm also applies to any other CELP-based voice codecs.

Figure 9:
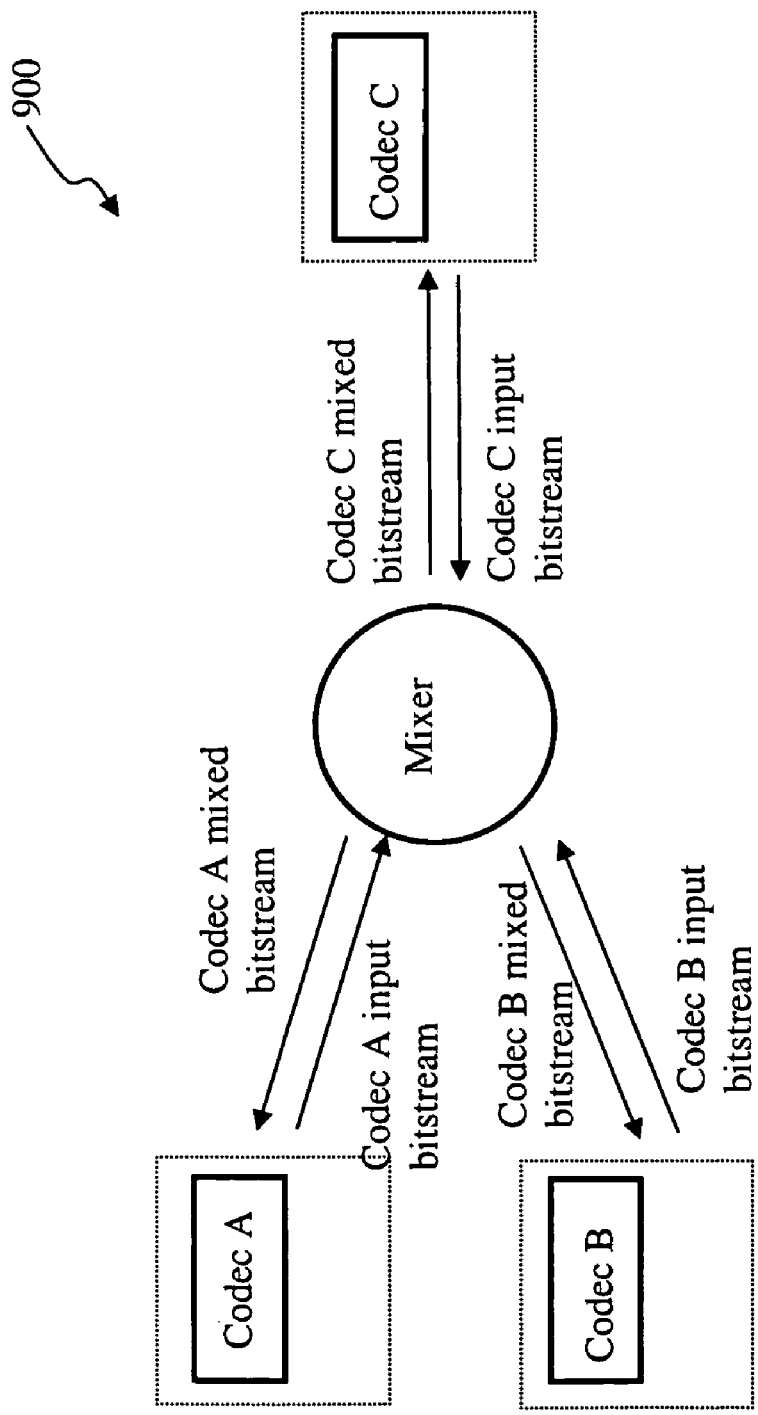
FIG. 9 is a schematic diagram of a communication link connecting three speakers with a multi-input mixer according to an embodiment of the present invention.

FIG. 9 is a schematic depicting a multi-input mixer 900 that has multiple compressed voice signals as input. The compressed signals may have been encoded using different codec standards. The multi-input mixer mixes the speech information from the multiple inputs, and outputs mixed compressed signals.

In a specific embodiment, the multi-input mixing module comprises a feature detection unit capable of receiving one or more sets of CELP parameters and external commands and detecting a plurality of speech features. In a specific embodiment, the feature detection unit is adapted to determine a plurality of speech signal features, the determining including classifying an input represented by the CELP parameters as active speech, silence descriptor frames, or discontinuous transmission frames. In other embodiments, the feature detection unit determines a plurality of speech signal features including one or more of LSP spectrum information, pitch information, fixed-codebook information, energy information. The module also has a sorting unit capable of processing the detected features of the more than one set of CELP parameters and ranking an order of importance for each set of CELP parameters based upon a predetermined criteria. The sorting unit receives data from the feature detection unit, and arranges the order of importance of the multiple sets of CELP parameters based upon the predetermined criteria according to certain embodiments. In a specific embodiment, the more than one set of CELP parameters can be characterized by more than one voice compression standards, or two sets of CELP parameters can be characterized by the same voice compression standard or all sets of CELP parameters can be characterized by the same voice compression standard. The more than one set of CELP parameters may have been interpolated if they have been generated using different voice compression standards to match the frame size, subframe size or other characteristic in certain embodiments. Additionally, the module has a mixing decision unit capable of determining a processing strategy, selecting some or all sets of CELP parameters for processing, and controlling the processing of the more than one set of CELP parameters. According to a specific embodiment, the mixing decision unit receives data from the sorting unit and external control commands to determine the sets of CELP parameters that are processed. A mixing computation unit capable of processing more than one set of CELP parameters is included. Preferably, the mixing computation unit can pass through a single set of CELP parameters, or select and mix multiple sets of CELP parameters, or send silence description data information.

Conventional voice mixing solutions handle voice codec inputs in a tandem approach. The speech information contained in the multiple bitstream inputs is obtained and decoded. Voice mixing of the inputs is performed in the speech domain, and the mixed speech is then re-encoded. An example of a voice mixing application is a conference bridge which handles multiple channels during a conference call. In a conference call scenario, if the participants have different voice codecs, the re-encoding process involves multiple specific encoding processes for the mixed speech.

Figure 10:
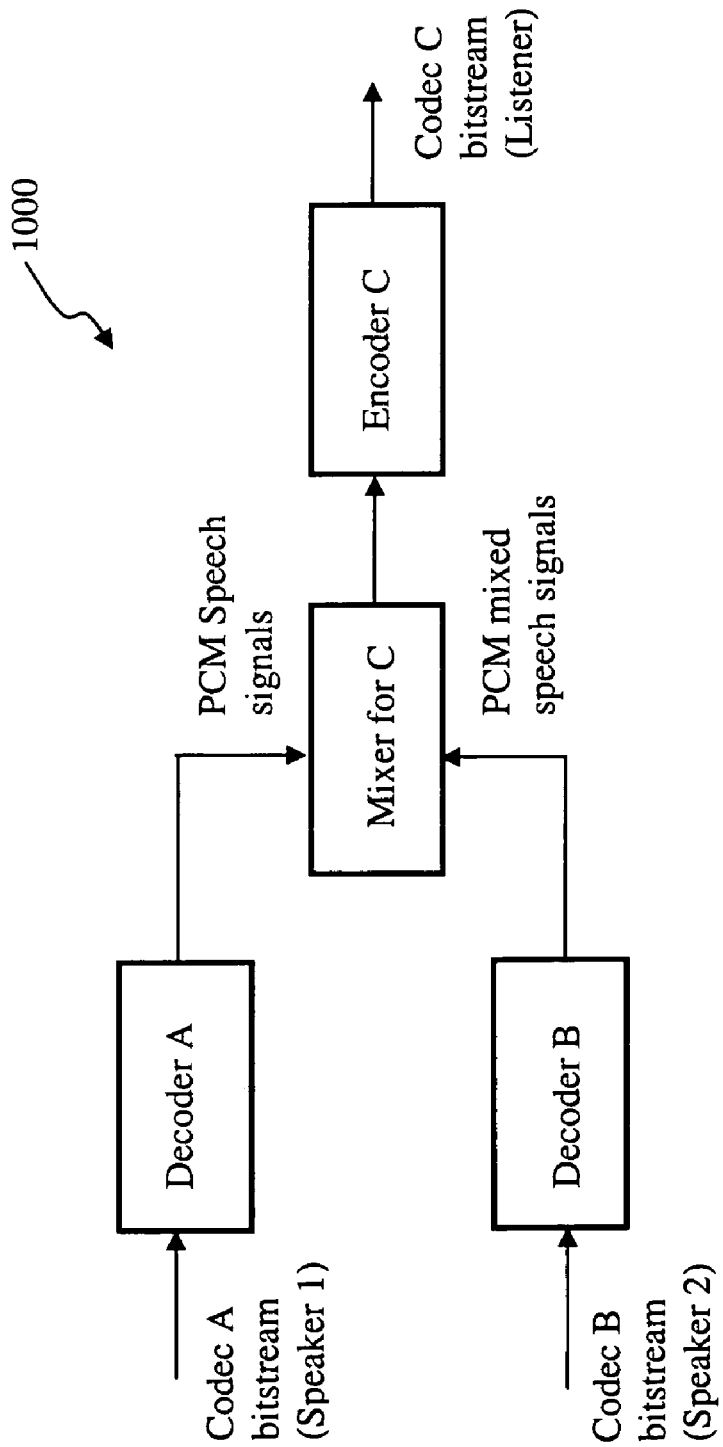
FIG. 10 is a simplified diagram of conventional multi-input mixing among speakers with compression voice codec formats.

FIG. 10 illustrates a conventional voice mixing solution 1000 in a tandem approach. Speaker 1 sends speech information in codec A compression format, and speaker 2 sends speech information in codec B compression format. The listener accepts codec C voice compression format. In order to mix speech from speakers 1 and 2, and to send mixed speech to the listener, the voice mixer requires decoders A and B to convert two input voice compression formats to the same speech domain, and then it mixes the input speech signals. Before sending the mixed signal, it needs to be re-encoded to codec C format.

It is obvious that a tandem-based approach to voice mixing is not efficient. It involves the complete decoding of the incoming bitstreams to speech signals, the combining of these signals in the speech space, and the complete encoding of the mixed speech signals to the outgoing bitstreams.

Figure 11:
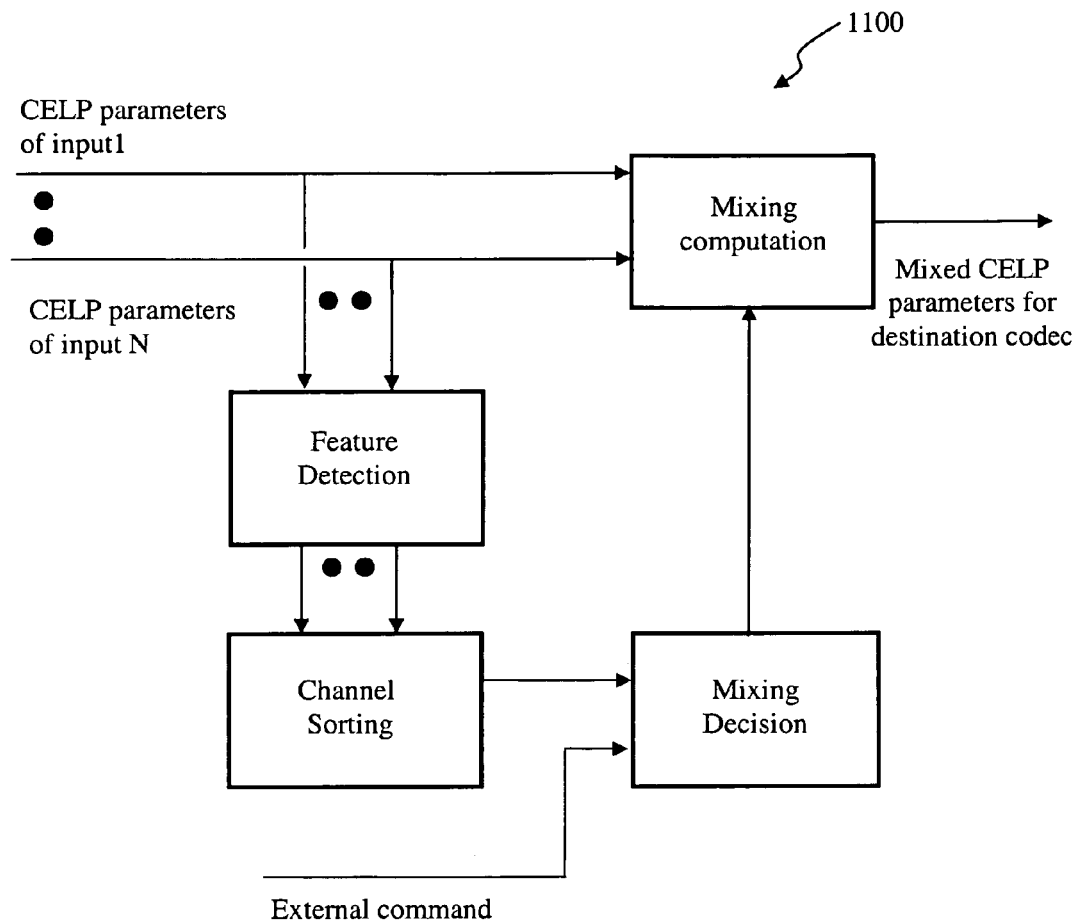
FIG. 11 is a simplified block diagram representation of an apparatus of a multi-input mixing module according to an embodiment of the present invention.

FIG. 11 is a block diagram further illustrating the multi-input mixing module 1100 in the described embodiment according to the present invention. The multi-input mixing module comprises a feature detection sub-module, a sorting sub-module, a mixing decision sub-module and a mixing computation sub-module. The feature detection sub-module computes speech signal features from each set of CELP parameters. If the CELP parameters are produced from different CELP compression standards, interpolation of the CELP parameters is required to match the frame size, subframe size, or other characteristic. The signal features computed include signal energy, frame type and signal type (i.e. active speech, inactive speech, discontinuous transmission). The sorting sub-module computes the importance of each set of CELP parameters from computed signal features and sorts the input sets of CELP parameters according to their importance. The mixing decision sub-module combines the factors from the sorting results, external commands, and previous mixing decision to determine the mixing strategy. The decision can be that no sets of CELP parameters are selected, only one set of CELP parameters is selected, part of some sets of CELP parameters are selected, or all sets of CELP parameters are selected. The mixing computation sub-module mixes the selected sets of CELP parameters and outputs the mixed CELP parameters.

As an example, the multi-input mixing module is used to mix input channels during a conference call. There are three participants, labeled 1, 2, 3, joining the call, and only participant 1 is talking at a certain time. The mixing decision for the direction to participant 1 is that no input channels are selected, as participants 2 and 3 are silent. The mixing decision for the directions to participants 2 and 3 is that only the channel from participant 1 is selected, as there is only one channel detected as containing active speech.

If both participants 1 and 2 are talking at a certain time, the mixing decision to participant 3 is that input channels 1 and 2 are selected. However, the mixing decision for the directions to participants 1 and 2 is that only single channel is selected as the input channel from participant 3 is silent. The mixing module can be configured to not mix a participant's speech to itself in order to avoid unwanted echoes.

There are several mixing computation approaches. As an example, for mixing two inputs, A and B, the total subframe excitation energy for each incoming stream is given by the expressions:

$$Ex_A = \sum_{n=1}^{N} e_A^2(n)$$

and $$Ex_B = \sum_{n=1}^{N} e_B^2(n)$$

where $e_A(n)$ and $e_B(n)$ are excitation vectors of inputs A and B respectively, N is the subframe size of the destination codec, and $Ex_A$ and $Ex_B$ are energies of inputs A and B respectively.

The pitch lag can be derived as $$PL_{mix} = \begin{cases} PL_A & Ex_A \geq Ex_B \\ PL_B & \text{otherwise} \end{cases}$$

where $PL_A$ and $PL_B$ are pitch lags of inputs A and B respectively, $PL_{mix}$ is the pitch lag of mixed signal.

There are a few different methods for the creation of the new LSP parameters. The first of these involves converting LSP parameters to spectrum parameters, averaging the spectrum parameters according to subframe energy, and converting back from spectrum parameters to LSP parameters. The averaging of spectrum parameters is shown in the equation below, $$LSF_{mix} = \frac{LSF_A \cdot Ex_A + LSF_B \cdot Ex_B}{Ex_A + Ex_B}$$

where $LSF_A$ and $LSF_B$ are spectrum parameters of input A and B respectively, and $LSF_{mix}$ are the spectrum parameters of the mixed signal.

Another method would be to reintroduce the LSP contribution to the individual excitation signals, to combine the filtered excitation signals and then to recalculate the LSP parameters and resultant excitation.

Another method involves ignoring the LSP parameters of the lower energy inputs, and only using the LSP parameters of the higher energy inputs, or based on some control parameters, such as channel priority.

Similar to the LSP mixing computation, the mixed excitation parameters can be computed by a few different methods. They can be obtained by averaging excitation parameters according to subframe energy, re-calculating them using mixed LSP parameters, or only using the excitation of the highest energy input.

In many scenarios, such as teleconferencing, not all of the sets of CELP parameters will represent active speech. In this case, the CELP parameters represent silence description frames. These frames are ignored. In other words, the only sets of CELP parameters that are mixed are those representing signals which contain speech. This reduces the amount of computations as well as rejects noise transmitted in sets of CELP parameters that do not represent active speech.

Figure 12:
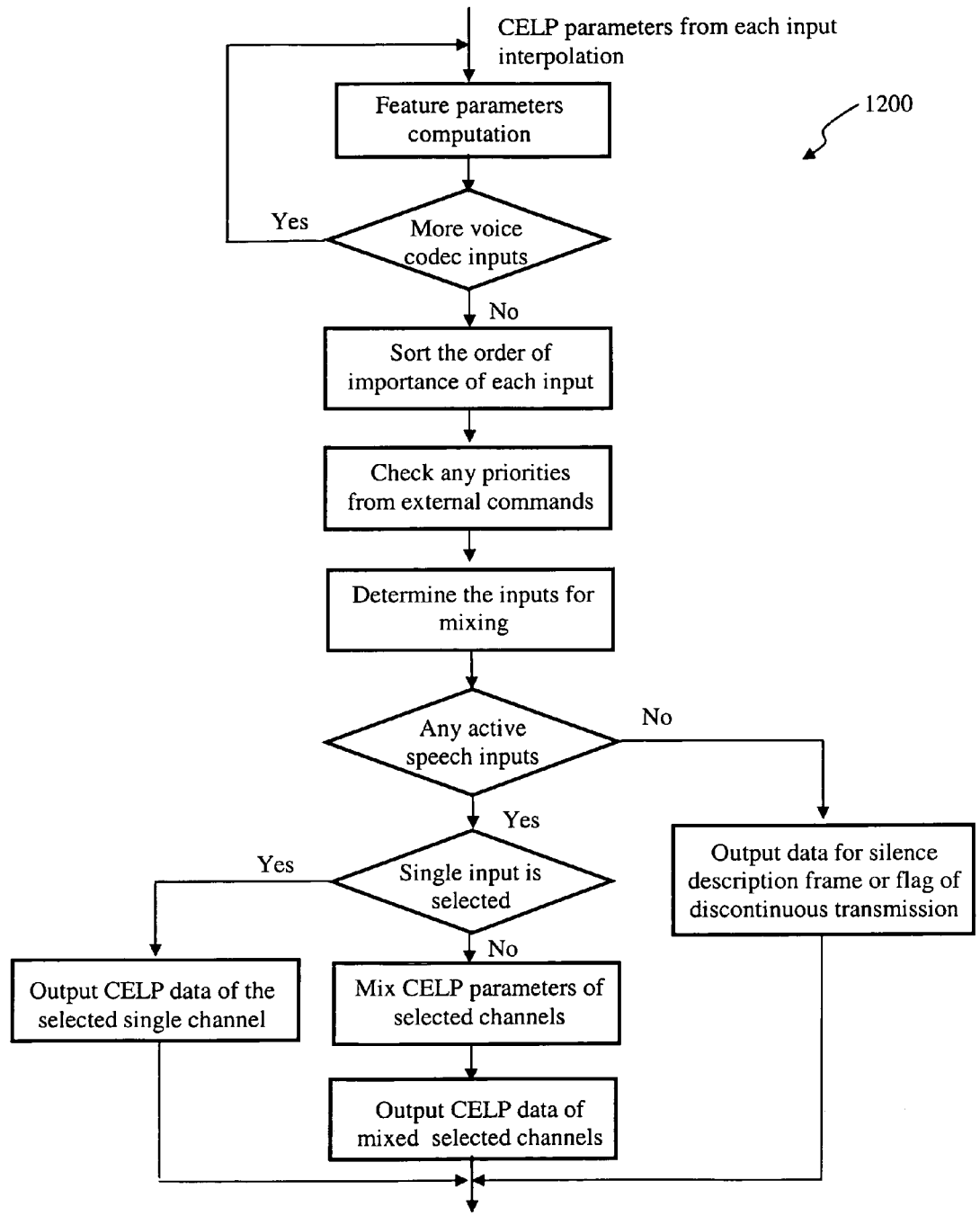
FIG. 12 is a flowchart of a multi-input mixing method according to an embodiment of the present invention.

FIG. 12 illustrates a flowchart of the CELP domain multi-input mixing method 1200. It involves performing signal feature computation on each set of CELP parameters; arranging the order of importance of the sets of CELP parameters according to the results of the feature computation; checking any priorities specified by external commands; determining the sets of CELP parameters that are going to be mixed according to their importance and priority; mixing the selected sets of CELP parameters; and finally outputting the mixed CELP parameters.

There are mainly three types of mixing strategies. In the first case, whereby none of the sets of CELP parameters represent active speech, the mixing computation outputs silence frame descriptor or discontinuous transmission information. In the second case, whereby only one set of CELP parameters represents active speech, or only one set of CELP parameters is selected for mixing, the mixing computation outputs the selected CELP parameters as the mixed result. In the third case, whereby more than one set of CELP parameters is selected for mixing, the mixing computation mixes the selected sets of CELP parameters and outputs the mixed result.

Figure 13:
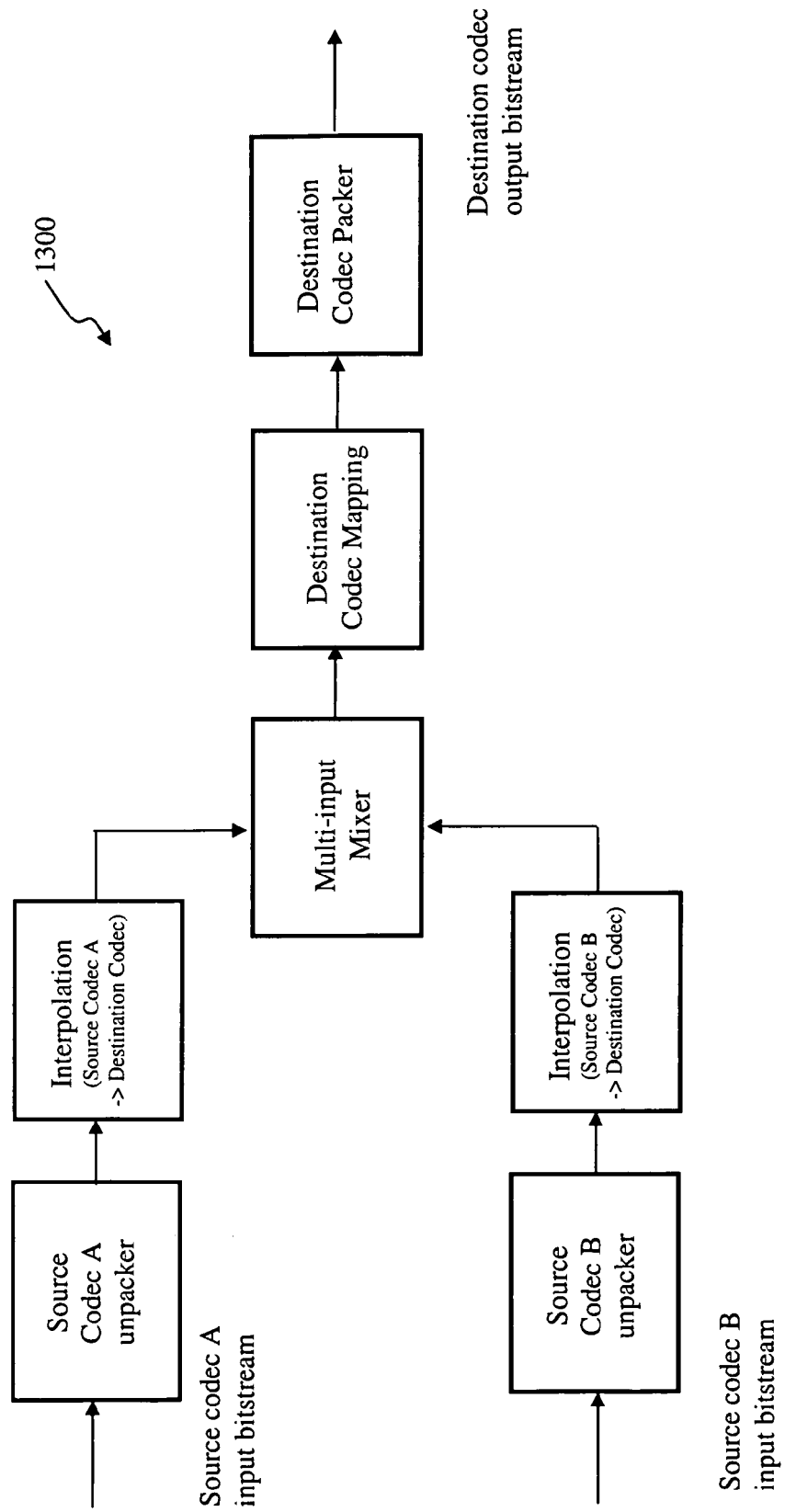
FIG. 13 is a simplified block diagram representation of an apparatus of multi-input mixing within a voice transcoder according to an embodiment of the present invention.

FIG. 13 illustrates a block diagram of an embodiment of multi-input mixing 1300 in the CELP domain within a voice transcoder according to the present invention. The voice transcoder with multi-input mixing connects more than two participants. As an example, the multi-input mixing system connects three participants. In order to perform mixing of two source codec input compressed speech signals and transcode to a destination codec format, the multi-input mixing system comprises a source codec unpacker module that unpacks the first input bitstream data to its CELP parameters; another source codec unpacker module that unpacks the second input bitstream to its CELP parameters; an interpolation module that converts the first source codec CELP parameters to interpolated CELP parameters that match the frame and subframe size of the destination codec; another interpolation module that converts the second source codec CELP parameters to the interpolated CELP parameters that match the frame and subframe size of the destination codec; a mixing module that mixes the interpolated CELP parameters from two inputs and sends the mixed CELP parameters to the next stage; a destination codec mapping module that converts the mixed CELP parameters to quantized CELP parameters according to the destination codec; and a destination codec packer module that converts the quantized CELP parameters into a bitstream according to the destination codec standard.

According to the described embodiment, the incoming bitstreams are not fully decoded to the speech space, but rather they are mixed in the CELP parameter space. This offers the advantage of considerably lower computation requirements, since the incoming bitstreams are not fully decoded to speech signals and fully re-encoded again.

Figure 14:
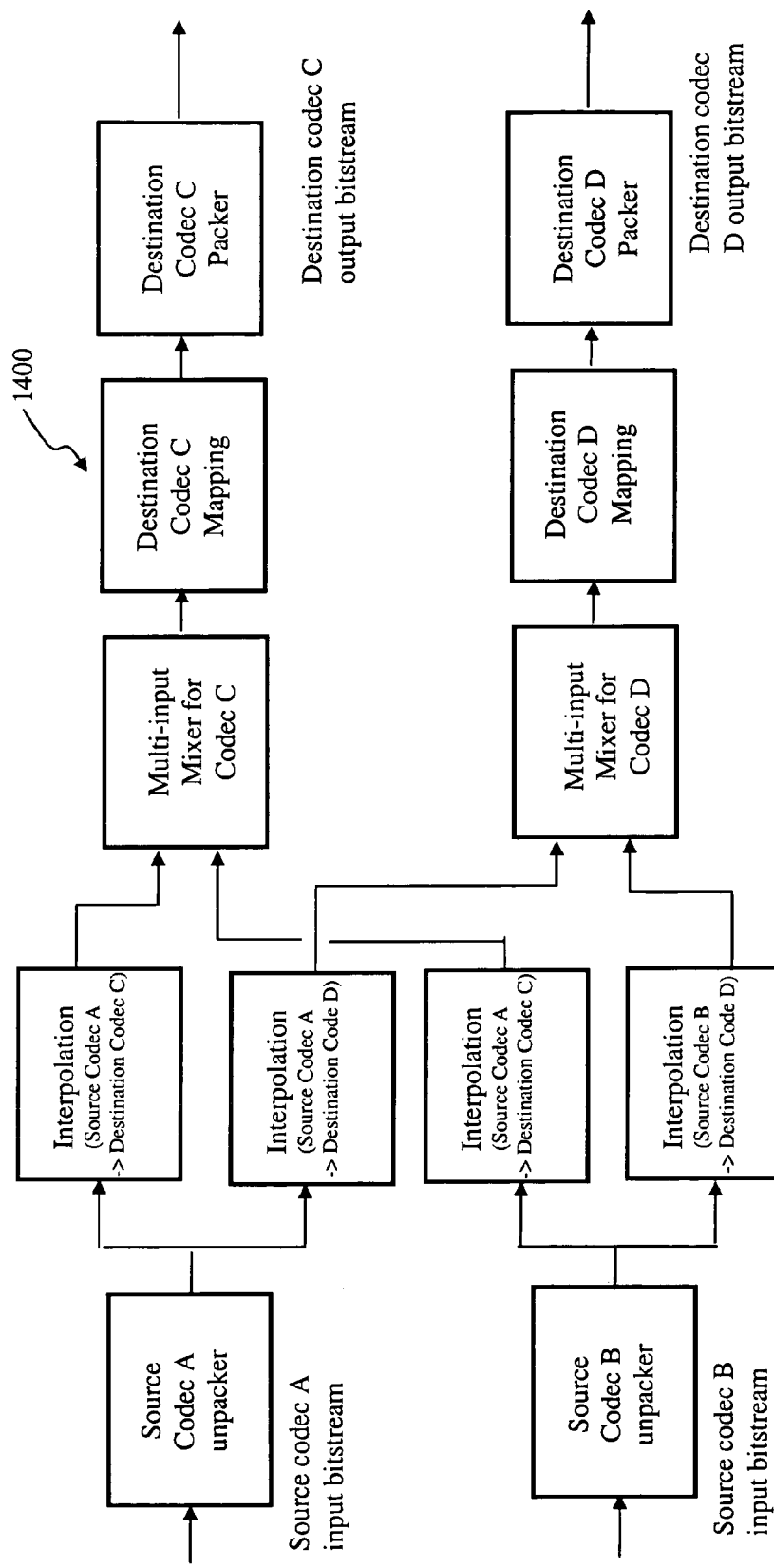
FIG. 14 is a block diagram representation of an apparatus for a multi-input mixer within a voice transcoder with different voice codec outputs according to an embodiment of the present invention.

FIG. 14 illustrates a block diagram of another configuration of a multi-input mixer 1400 in voice transcoding. A mixed compressed voice signal is required to be sent to two destination codecs with different frame sizes.

Figure 15:
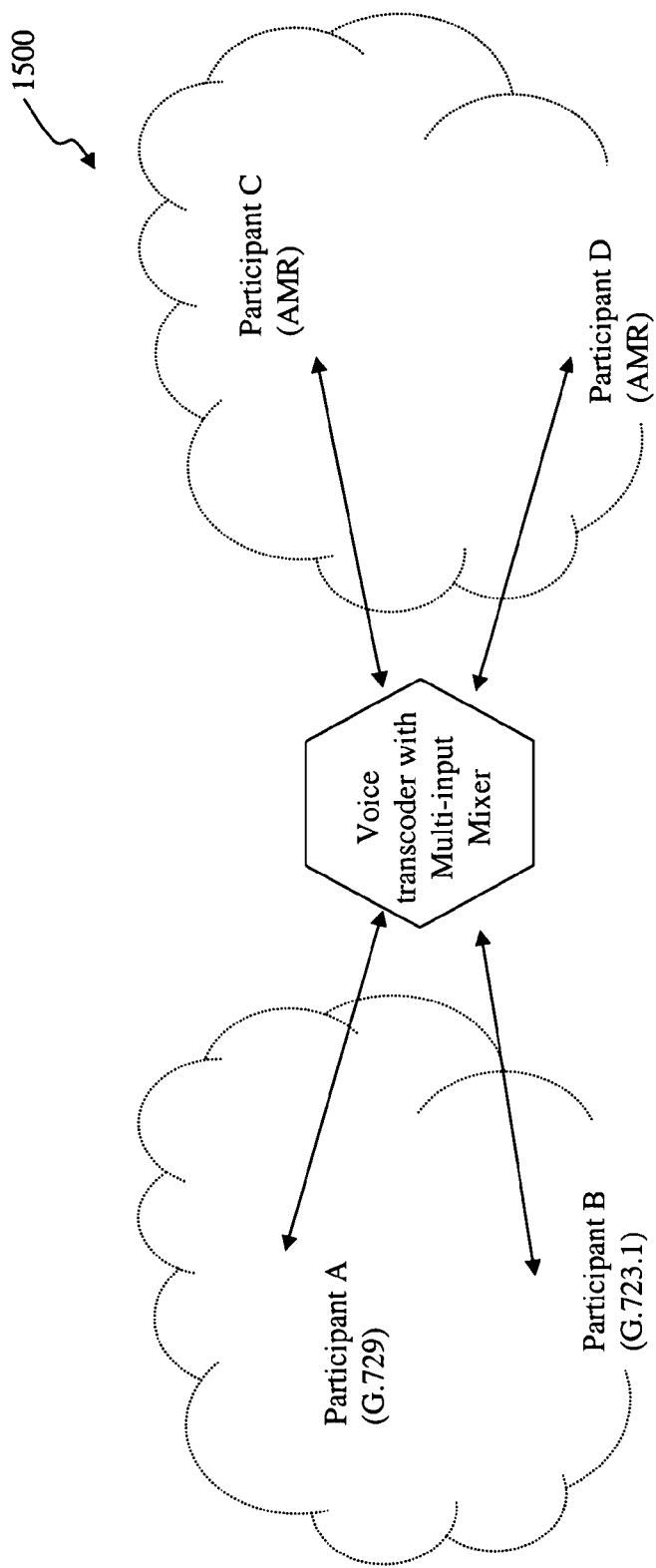
FIG. 15 is a schematic diagram of a four-party conference among four different participants with different voice codec formats according to an embodiment of the present invention.

FIG. 15 depicts an exemplary voice transcoder 1500 with multi-input mixer used in a conference call among voice-over-IP packet networks and wireless communication systems. There are four participants joining the conference call. Two participants are from packet networks, and two participants are from wireless communication systems. All voice input signals are in compressed voice formats. These formats are different. They are generated by voice codecs G.729, G.723.1 and GSM-AMR. Participants A and B within packet networks use G.729 codec and G.723.1 codec separately, and participants C and D within wireless communication systems use GSM-AMR codec.

Figure 16:
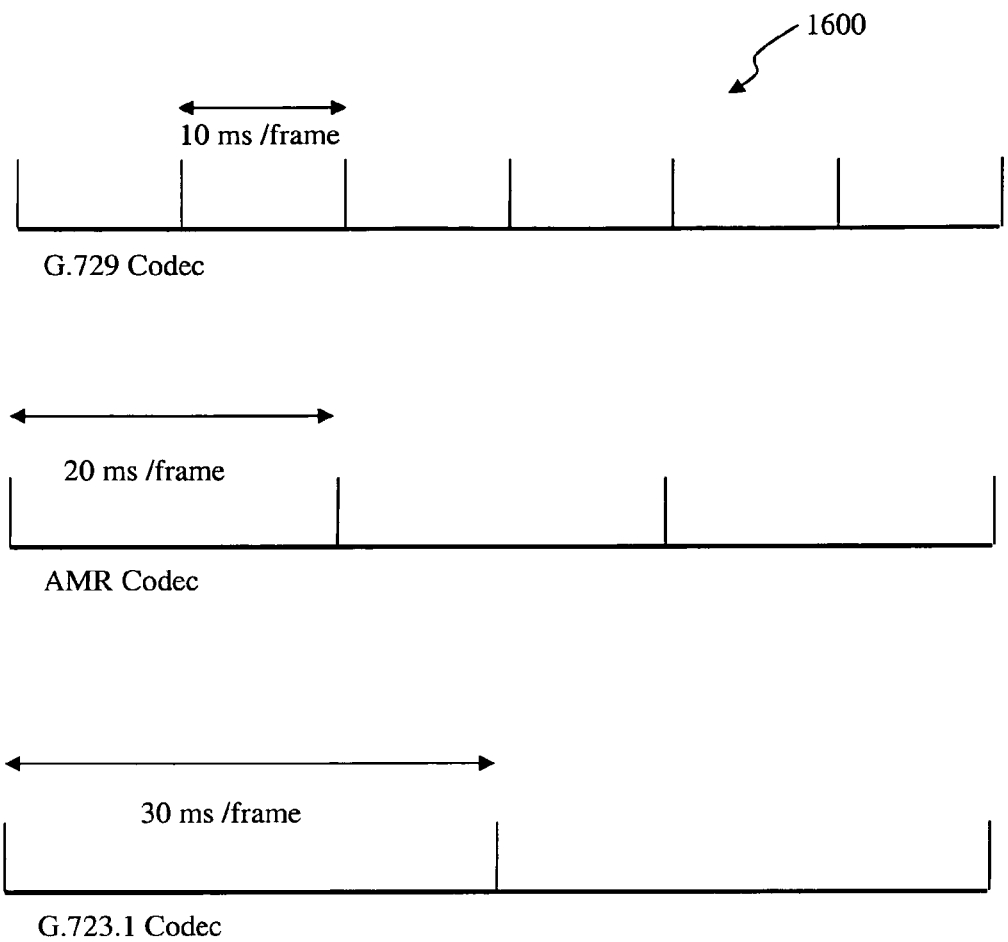
FIG. 16 illustrates frame size difference among voice codecs G.729, GSM-AMR and G.723.1 according to an embodiment of the present invention.

FIG. 16 shows the difference in frame size and subframe size among three voice codecs G.729, GSM-AMR, and G.723.1 1600. These three voice codecs have different size frame lengths. G.729 codec has a frame length of 10 ms. GSM-AMR codec has a frame length of 20 ms. G.723.1 has frame length of 30 ms. In addition, G.729 has two subframes per frame, while GSM-AMR and G.723.1 have four subframes per frame.

Figure 17:
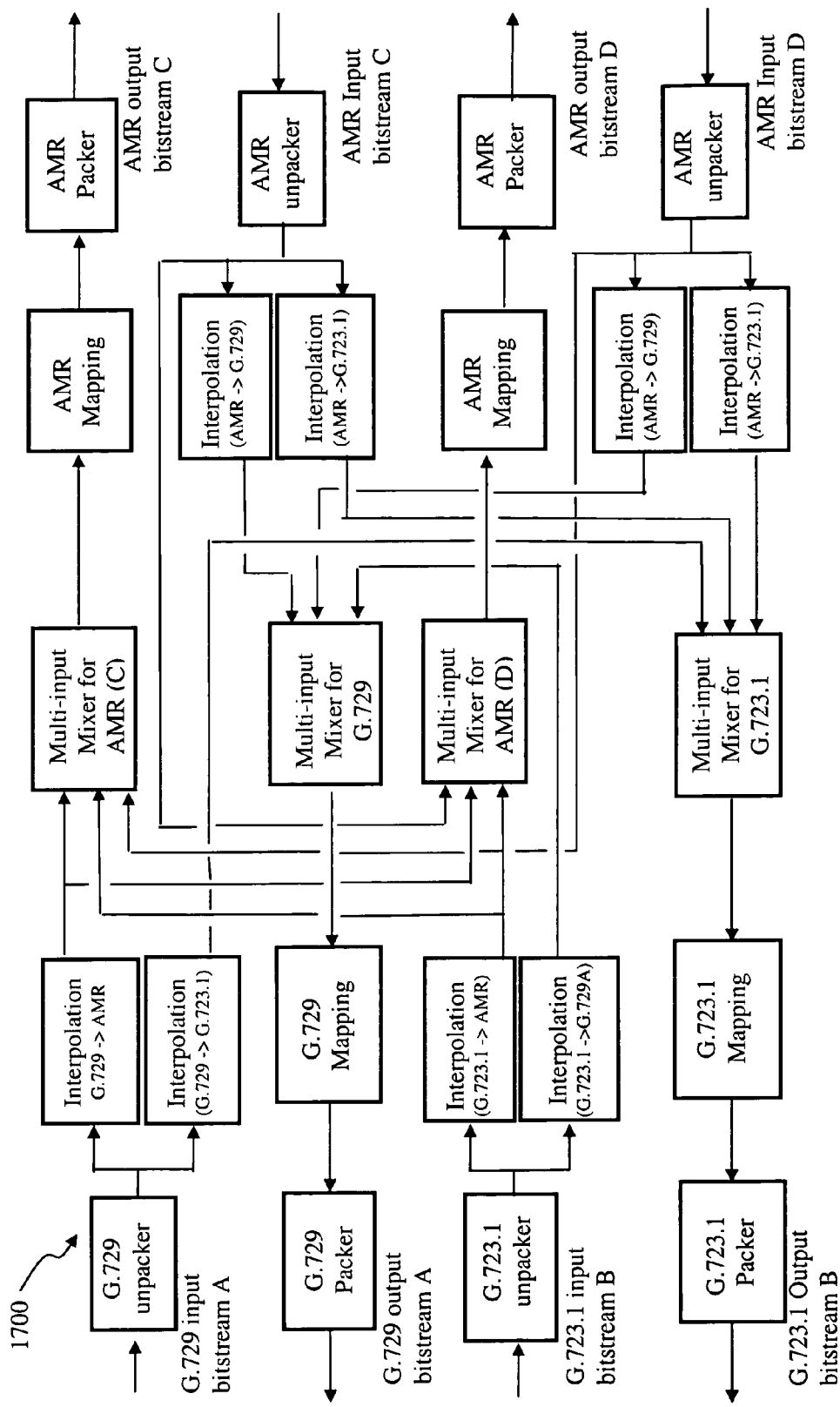
FIG. 17 is a block diagram of an embodiment for a four-party multi-input mixing system within voice transcoding according to an embodiment of the present invention.

FIG. 17 illustrates a block diagram of voice transcoding with a multi-input mixer 1700 for all directions between the codecs G.729, G.723.1 and GSM-AMR according to the present invention. Each connection to a participant has a path for both input and output bitstreams. Hence, for each codec standard the transcoder includes an unpacker module and a packer module to handle input and output bitstreams, a mixing module to mix the speech information of all participants other than that of the participant at the destination codec, and a specific mapping module to convert mixed CELP parameters to quantized CELP parameters. As there are three different codecs G.723.1, GSM-AMR and G.729 used in the conference call, each connection requires two interpolation modules following an unpacker module. The two interpolation modules interpolate source codec CELP parameters to interpolated CELP parameters which match the frame size, subframe size and other characteristic of the other destination codecs. For an example, an input bitstream from participant A is in G.729 codec format. To participant A, the destination codecs are G.723.1 for participant B, and GSM-AMR for participants C and D. The connection of G.729 requires an interpolation module G.729→AMR to convert G.729 CELP parameters to AMR CELP parameters, and another interpolation module G.729→G.723.1 to convert G.729 CELP parameters to G.723.1 CELP parameters. Thus according to the description of multi-input mixing methods above, the system can perform voice transcoding with multi-input mixing functionality without requiring full decoding and re-encoding processes. Depending upon the embodiment, there can be other variations, modifications, and alternatives. Certain examples of other CELP transcoders can be found throughout the present specification and more particularly below.

The invention of DTMF signal detection and multi-input mixing in the CELP domain described in this document is generic to CELP parameters generated by all CELP based voice codecs such as codecs G.723.1, GSM-AMR, EVRC, G.728, G.729, G.729A, QCELP, MPEG-4 CELP, SMV, AMR-WB, VMR and any voice codecs that makes use of code-excited linear prediction voice coding.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein

What is claimed is:

1. An apparatus for feature processing of telecommunications signals, the apparatus being adapted to operate in a CELP domain without decoding to a speech signal domain the apparatus comprising:
   a dual-tone modulation frequency (DTMF) signal detection module, the dual-tone modulation frequency (DTMF) signal detection module being adapted to determine one or more DTMF tones based upon at least one or more mint CELP parameters, and the DTMF signal detection module being adapted to output the one or more DTMF signals if determined;
   a multi-input mixing module coupled to the DTMF signal detection module, the multi-input mixing module being adapted to process CELP parameters from more than one CELP-based codecs, representing respective more than one voice signals, into a single set of CELP parameters;

wherein the dual-tone modulation frequency (DTMF) signal detection module comprises:
   a DTMF feature computation unit capable of receiving the one or more CELP parameters and external commands and computing one or more DTMF features,
   one or more DTMF feature pattern tables having one or more specific feature data corresponding to the one or more DTMF signals,
   a DTMF feature comparison unit, the DTMF feature comparison unit being adapted to process the one or more DTMF features derived from the DTMF feature computation unit with the one or more specific feature data in DTMF feature pattern tables to identify one or more DTMF specific signals and to classify the one or more DTMF specific signals,
   a DTMF feature buffer capable of storing the one or more DTMF feature parameters and the one or more DTMF classification data of one or more previous sub-frames or frames;
   a DMP decision unit capable of determining the one or more DTMF signals from DTMF classification data of a current and one or more previous sub-frames or frames according to one or more DTMF specifications and sending out the DTMF determined signals.

2. The apparatus of claim 1, wherein the DTMF feature computation unit processes the one or more DTMF features using at least one or more of linear prediction parameters information, pitch information, energy information.

3. The apparatus of claim 1, wherein the DTMP feature pattern tables having specific pre-computed feature data associated from CELP parameters corresponding to the one or more DTMF signals.

4. The apparatus of claim 1, wherein the DTMF feature comparison unit classifies DTMF specific signals corresponding to 16 digits of "1", "2", "3", "4", "5", "7", "8", "9", "0", "A", "B", "C", "D","#", and "*" according to the internal telecommunication unit (ITU) specification.

5. The apparatus of claim 1, wherein the DTMP decision unit further comprises a logical state machine and DTMF signal criteria to determine the one or more DTMF signals and one or more specific digits.

6. An apparatus for feature processing of telecommunications signals, the apparatus being adapted to operate in a CELP domain without decoding to a speech signal domain, the apparatus comprising:
   a dual-tone modulation frequency (DTMF) signal detection module, the dual-tone modulation frequency (DTMF) signal detection module being adapted to determine one or more DTMF tones based upon at least one or more input CELP parameters, and the DTMF signal detection module being adapted to output the one or more DTMF signals if determined;
   a multi-input mixing module coupled to the DTMF signal detection module, the multi-input mixing module being adapted to process CELP parameters from more than one CELP-based codecs, representing respective more than one voice signals into a single set of CELP parameters;
   wherein the multi-input mixing module comprises:
   a feature detection unit capable of receiving one or more sets of CELP parameters and external commands and detecting a plurality of speech features;
   a sorting unit capable of processing the detected features of the more than one set of CELP parameters and ranking an order of importance for each set of CELP parameters based upon a predetermined criteria;

a mixing decision unit capable of determining a processing strategy, selecting some or all sets of CELP parameters for processing, and controlling the processing of the more than one set of CELP parameters;

a mixing computation unit capable of processing more than one set of CELP parameters.

7. The apparatus of claim 6, wherein the more than one set of CELP parameters can be characterized by more than one voice compression standards, or two sets of CELP parameters can be characterized by the same voice compression standard or all sets of CELP parameters can be characterized by the same voice compression standard.

8. The apparatus of claim 6, wherein the more than one set of CELP parameters may have been interpolated if they have been generated using different voice compression standards to match the frame size, subframe size or other characteristic.

9. The apparatus of claim 6, wherein the feature detection unit is adapted to determine a plurality of speech signal features, the determining including classifying an input represented by the CELP parameters as active speech, silence descriptor frames, or discontinuous transmission frames.

10. The apparatus of claim 6, wherein the feature detection unit determines a plurality of speech signal features including one or more of LSP spectrum information, pitch information, fixed-codebook information, energy information.

11. The apparatus of claim 6, wherein the sorting unit receives data from the feature detection unit, and arranges the order of importance of the multiple sets of CELP parameters based upon the predetermined criteria.

12. The apparatus of claim 6, wherein the mixing decision unit receives data from the sorting unit and external control commands to determine the sets of CELP parameters that are processed.

13. The apparatus of claim 6, wherein the mixing computation unit can pass through a single set of CELP parameters, or select and mix multiple sets of CELP parameters, or send silence description data information.

14. An apparatus for processing of telecommunications signals, the apparatus being adapted to operate in a CELP domain without decoding to a speech signal domain, the apparatus comprising:

a dual-tone modulation frequency (DTMW) signal detection module, the dual-tone modulation frequency (DTMF) signal detection module being adapted to determine one or more DTMF tones based upon at least one or more input CELP parameters, and the DTMF signal detection module being adapted to output the one or more DTMF signals if determined;

a multi-input mixing module coupled to the DTMF signal detection module, the multi-input mixing module being adapted to process CELP parameters from more than one CELP-based codecs, representing respective more than one voice signals, into a single set of CELP parameters;

wherein the CELP parameters represent silence descriptor frames.

15. An apparatus for feature processing of telecommunications signals, the apparatus being adapted to operate in a CELP domain without decoding to a speech signal domain, the apparatus comprising:

a dual-tone modulation frequency DTMF signal detection module, the dual-tone modulation frequency (DTMF) signal detection module being adapted to determine one or more DTMF tones based upon at least one or more input CELP parameters, and the DTMF signal detection module being adapted to output the one or more DTMF signals if determined;

a multi-input mixing module coupled to the DTMF signal detection module, the multi-input mixing module being adapted to process CELP parameters from more than one CELP-based codecs, representing respective more than one voice signals, into a single set of CELP parameters;

wherein the multi-input mixing module has a dynamic topology and is capable of configuring different topologies according to the number of input compressed signals.

16. A method for processing telecommunications signals in a CELP based domain, the method including determining DTMF tones and processing multiple input compressed signals using one or more CELP parameters of respective one or more CELP-based coders, without decoding to a speech signal, the method comprising:

inputting the one or more sets of CELP parameters and external commands;

determining one or more DTMF tones in a compressed signal from the one or more CELP parameters;

processing multiple sets of CELP parameters into a single set of CELP parameters:

outputting the determined one or more DTMF tones, if detected, and the processed CELP parameters in the single set;

wherein determining DTMF tones comprises:

deriving DTMF feature parameters from CELP parameters;

processing feature parameters with we-defined look-up tables of DTMF signal feature data to output one or more results;

transferring the one or more results to the DTMF decision unit;

determining classification results of one or more previous subframes to output one or more DTMF signals according to DTMP signal definition standards;

storing the one or more results of the current subframe and updating results of one or more previous subframes; and outputting DIME tones, if a DTMF signal is detected.

17. The method of claim 16, wherein the deriving the one or more DTMF features uses one or more of LSP spectrum information, pitch information, and energy information.

18. The method of claim 16, wherein the pre-defined look-up tables of DTMF signal feature data are pro-computed by converting DTMF signals to CELP parameters in a selected CELP compression format and are pre-loaded in tables before DTMF detection processing.

19. A method for processing telecommunications signals in a CELP based domain, the method including determining DTMF tones and processing multiple input compressed signals using one or more CELP parameters of respective one or more CELP-based coders, without decoding to a speech signal, the method comprising:

inputting the one or more sets of CELP parameters and external commands;

determining one or more DTMF tones in a compressed signal from the one or more CELP parameters;

processing multiple sets of CELP parameters into a single set of CELP parameters;

outputting the determined one or more DTMF tones, if detected, and the processed CELP parameters in the single set;

wherein the determining of the one or more DTMF tones is performed for every subframe.

20. A method for processing telecommunications signals in a CELP based domain, the method including determining DTMF tones and processing multiple input compressed signals using one or more CELP parameters of respective one or more CELP-based coders, without decoding to a speech signal, the method comprising:

inputting the one or more sets of CELP parameters and external commands;

determining one or more DTMF tones in a compressed signal from the one or more CELP parameters;

processing multiple sets of CELP parameters into a single set of CELP parameters;

outputting the determined one or more DTMF tones, if detected, and the processed CELP parameters in the single set;

wherein the processing of multiple sets of CELP parameters can handle silence description frames and discontinuous transmission.

21. A method for processing telecommunications signals in a CELP based domain, the method including determining DTMF tones and processing multiple input compressed signals using one or more CELP parameters of respective one or more CELP-based cod without decoding to a speech signal, the method comprising:

inputting the one or more sets of CELP parameters and external commands;

determining one or more DTMF tones in a compressed signal from the one or more CELP parameters;

processing multiple sets of CELP parameters into a single set of CELP parameters;

outputting the determined one or more DTMF tones, if detected, and the processed CELP parameters in the single set;

wherein the processing of multiple sets of CELP parameters comprises:

performing signal feature computation on each set of input CELP parameters;

arranging the order of importance of each set of input CELP parameters according to the results of the signal feature computation;

determining the mixing strategy according to the order of importance and external commands;

mixing the input sets of CELP parameters according to the chosen mixing strategy;

outputting the mixed CELP parameters.

22. The method of claim 21, wherein performing signal feature computation computes signal features using one or more of LSP information, pitch information, excitation information, fixed codebook information, energy information, silence frame information.

23. The method of claim 21, wherein the mixing strategies include selecting only one set of CELP parameters wit the highest importance, selecting a specific set of CELP parameters according to an external command, mixing some of the input sets of CELP parameters, or mixing all of the input sets of CELP parameters.

24. The method of claim 21, wherein the input sets of CELP parameters are input channels to a conference call, and the sets of CELP parameters selected for mixing do not include the CELP parameters of the destination channel, to avoid echo due to delay.

* * * * *